May 17, 1949.　　　N. R. MATSON ET AL　　　2,470,510
LIQUID LEVEL GAUGE
Filed June 20, 1947
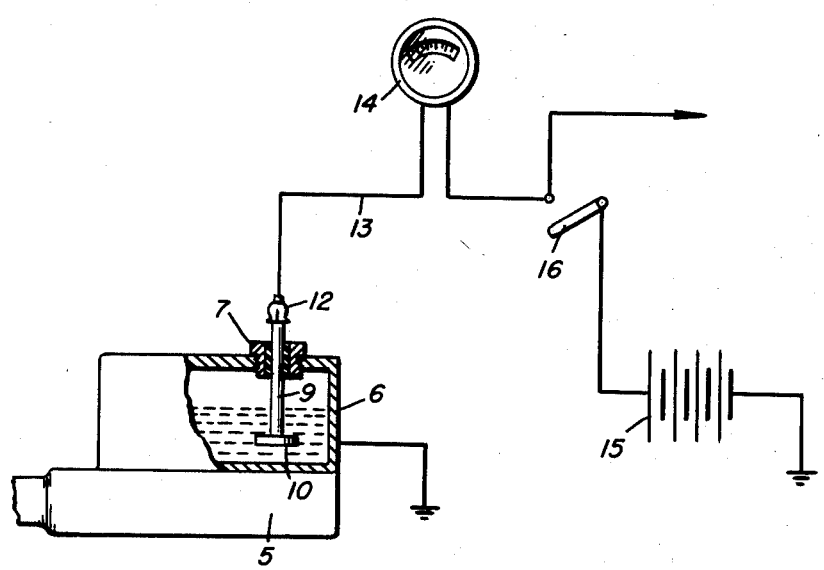
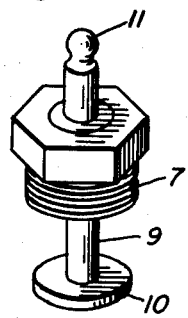
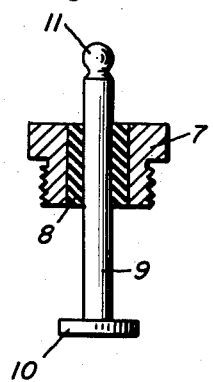
Inventors
Nathan Ross Matson
Leo A. Milewski
By
*Lawrence A. O'Brien
and Harvey B. Jackson*
Attorneys Patented May 17, 1949

2,470,510

UNITED STATES PATENT OFFICE 2,470,510

LIQUID LEVEL GAUGE

Nathan Ross Matson and Leo A. Milewski, Glendale, Calif., assignors of thirty-three and one-third per cent to Albert Earl Hedrick, Glendale, Calif.

Application June 20, 1947, Serial No. 755,818

1 Claim. (Cl. 73—304)

The present invention relates to new and useful improvements in brake fluid gauges to indicate the level or amount of brake fluid in the master cylinder of an automobile whereby the motorist may determine at all times when the master cylinder needs refilling before the brakes fail to function.

An important object of the present invention is to provide an electrically operated gauge or indicator of this character and which is simple and practical in construction, efficient and reliable in operation, relatively inexpensive to manufacture and install in operative position in a master brake cylinder without necessitating any changes or alterations in the construction thereof and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a master brake cylinder with parts broken away and shown in section and showing a diagram of the electric circuit for the gauge;

Figure 2 is an enlarged perspective view of the electrode and plug for mounting the same in the cylinder; and Figure 3 is a vertical sectional view thereof.

Referring now to the drawing in detail wherein, for the purpose of illustration we have disclosed a preferred embodiment of the invention, the numeral 5 designates the conventional master cylinder for the hydraulic brake system of an automobile and including the reservoir or chamber 6 in which the brake fluid is contained.

A filler plug 7 is threaded in the top of the chamber 6 and is drilled to receive an insulation sleeve 8 through which extends a rod electrode 9, the rod being frictionally held in the sleeve and adjustable vertically therein by sliding the rod upwardly or downwardly in the sleeve.

The lower end of the electrode 9 is formed with a head or flange 10 and the upper end of the rod is formed with a knob 11 to receive a snap-on terminal 12 to electrically connect the electrode in a circuit 13 leading to a low reading D. C. milliammeter 14 and which is also connected to the battery 15 of the automobile with a switch 16 of conventional construction interposed between the battery and the milliammeter.

The electrode 9 projects downwardly in the chamber 6 and is immersed in the liquid in the chamber. The circuit 13 is grounded through the master brake cylinder 5 as shown in Figure 1 of the drawing, and accordingly in the operation of the device with the switch 16 closed, the fluid in the chamber 6 acts as a conductor having a variable resistance according to the level of the fluid in the chamber and which is indicated on the gauge 14. The driver of the automobile will thus be enabled at all times to determine the level of the liquid in the master brake cylinder and thus avoid the danger of failure of the brakes when the fluid reaches too low a level.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A liquid level gauge comprising a chamber containing fluid included in a circuit with a gauge instrument, an insulation sleeve in the top of the chamber, and an electrode slidable in the sleeve and frictionally held in vertically adjusted position, said electrode having its upper end connected in said circuit, said electrode having a flange at its lower end immersed in the liquid to provide a variable resistance in the circuit in accordance with variations of the level of the liquid, said gauge instrument being responsive to such variations to indicate the level of the liquid.

NATHAN ROSS MATSON.
LEO A. MILEWSKI.

REFERENCES CITED

The following references are of record in the file of this patent:

UNITED STATES PATENTS

| Number | Name | Date |
|---|---|---|
| 23,272 | Soltmann | Mar. 15, 1859 |
| 475,255 | Sterling | May 17, 1892 |
| 885,935 | Mahon | Apr. 28, 1908 |

FOREIGN PATENTS

| Number | Country | Date |
|---|---|---|
| 148,827 | Great Britain | Oct. 10, 1921 |
| 802,699 | France | June 13, 1936 |